United States Patent [19]

Hess et al.

[11] B 3,923,599

[45] Dec. 2, 1975

[54] PROCESS FOR PREPARING PLANT ENZYME PREPARATIONS OF LOW GERM CONTENT

[75] Inventors: Hans Hess, Binningen; Guenther Mueller, Arlesheim; Xaver Buehlmann, Basel, all of Switzerland

[73] Assignee: Ciba-Geigy Corporation, Ardsley, N.Y.

[22] Filed: June 26, 1972

[21] Appl. No.: 266,195

[44] Published under the Trial Voluntary Protest Program on January 28, 1975 as document no. B 266,195.

[30] Foreign Application Priority Data

July 5, 1971 Switzerland............................ 9831/71

[52] U.S. Cl................ 195/66 R; 195/62; 195/63; 195/68; 195/123
[51] Int. Cl.²................... C12D 11/00; C07G 7/022
[58] Field of Search.......... 195/66 R, 121, 122, 123, 195/68, 62, 63; 424/351, 350; 21/58

[56] References Cited
UNITED STATES PATENTS
2,958,632  11/1960  Schwarz et al....................... 195/60

FOREIGN PATENTS OR APPLICATIONS
963,759   7/1964  United Kingdom................... 195/63
1,124,262 8/1968  United Kingdom................. 424/350

*Primary Examiner*—Lionel M. Shapiro
*Assistant Examiner*—Thomas G. Wiseman
*Attorney, Agent, or Firm*—Joseph G. Kolodny; John J. Maitner; Theodore O. Groeger

[57] ABSTRACT

A process for the manufacture of plant enzyme preparations of papain, ficin, or bromelin of low germ content, i.e. less than 10,000 germs per gram with no detectable bacteria of the group Enterobacteriaceae, which in comparison to the unpurified corresponding enzymes displays a practically unchanged enzyme activity. The contaminated plant preparation is mixed with an emulsion of a halogenated hydrocarbon with a boiling point between 15°C and 100°C and, if desired, a cellulose derivative to form a plastic mass which is then dried in a known manner.

13 Claims, No Drawings

PROCESS FOR PREPARING PLANT ENZYME PREPARATIONS OF LOW GERM CONTENT

The invention relates to plant enzyme preparations of low germ content which display a practically unchanged enzyme activity in comparison to unpurified corresponding enzymes, and to a process for their manufacture.

Enzyme preparations, such as papain, ficin, and bromelin, are sensitive plant extracts which are mostly contaminated with large amounts of bacteria, including also sometimes with pathogenic kinds which are already present in the organic material to be extracted. Contamination during manufacture is also possible. In using the extracts on humans, however, it ought not to be possible to detect bacteria of the group of the Enterobacteriacea (e.g. Salmonella, Shigella, *Escherichia coli*). Also the total germ count should not be greater than 10,000/g. Many commercial products show, however, that these requirements with regard to microbial contamination can scarcely be observed if the preparation is at the same time to possess a high enzyme activity. The reason for this is the very sensitive enzyme system which is at least partially destroyed, e.g. on conventional sterilization whith heat or ethylene oxide, but also by irradiation.

It has now been discovered that it is possible to obtain plant enzyme preparations of low germ content, in particular a bromelin preparation, and which have unchanged enzyme activity, by processing a corresponding contaminated enzyme preparation to a plastic mass with a stabilized emulsion of a halogenated hydrocarbon having a boiling point between 15°C and 100°C, especially between 30°C and 60°C, primarily methylene chloride, ethylene chloride, trichloroethylene or chloroform, optionally in the presence of a thickener, and drying this composition.

To carry out the process, preferably an emulsion of the halogenated hydrocarbon is first produced which advantageously contains about 10–25% of water. In doing so, a cellulose derivative, especially methylhydroxypropyl cellulose or ethylhydroxypropyl cellulose, for example "Klucel" or "Methocel HG 60", is appropiately used as stabilizer or thickener, in an amount of advantageously 2–10%, preferably about 3%. This solution or emulsion is added to the enzyme preparation, so that the mixture contains about 10–30%, preferably 10–15%, of water relative to the enzyme, and the mixture is processed in the usual manner, for example by kneading or intensive mixing, until a homogeneous, plastic mass is produced. This is then dried in the conventional manner, for example by fluidised bed drying or after suitable dilution by spray drying or comminution, e.g. pressing or beating through a sieve, and drying in a stream of air, to give a powder or granules with excellent flow properties which can be easily processed to solid forms of administration, such as tablets, coated tablets etc.

The invention also relates to the plant enzyme preparation of low germ content, especially the bromelin preparation, which may be obtained according to the process of the invention and in comparison to corresponding unpurified enzyme preparations displays an unchanged enzyme activity, and wherein it is no longer possible to detect any bacteria of the group Enterobacteriaceae in 1 g and which has a total germ count of less than 10,000 per gram.

The following Examples describe the invention in more detail, but without limiting the scope thereof in any way. The parts denote parts by weight.

EXAMPLE 1

A suspension of 3 parts of methylhydroxypropyl cellulose (Methocel 60HG) in 100 parts of methylene chloride is emulsified with 20 parts of water. The emulsion is processed with 150 parts of bromelin in a suitable mixing device. In the process a plastic mass is formed which is dried by mechanical comminution and, if necessary, brought to the desired particle size.

EXAMPLE 2

A suspension of 4 parts of methylhydroxypropyl cellulose in 100 parts of methylene chloride is emulsified with 25 parts of water. This emulsion is processed with 130 parts of crude papain in a suitable apparatus to form a plastic mass which is comminuted, dried and, if necessary, brought to the desired particle size.

EXAMPLE 3

A suspension of 4 parts of methylhydroxypropyl cellulose in 100 parts of methylene chloride is emulsified with 25 parts of water. This emulsion is processed with 130 parts of ficin in a suitable apparatus to give a plastic mass, which is comminuted, dried and, if necessary, brought to the desired particle size.

EXAMPLE 4

A suspension of 3.5 parts of alginic ester in 100 parts of chloroform is emulsified with 20 parts of water. The emulsion is processed with 150 parts of bromelin in a suitable mixing device to form a plastic mass, which is dried after mechanical communition and, if necessary, ground to the desired particle size.

EXAMPLE 5

A suspension of 5 parts of hydroxypropylmethyl cellulose (Klucel) in 100 parts of trichloroethylene is emulsified with 25 parts of water. This emulsion is processed with 150 parts of bromelin in a suitable apparatus to give a plastic mass, which is comminuted, dried and, if desired, brought to the desired particle size.

We claim:

1. A process for the manufacture of a plant enzyme preparation of papain, ficin or bromelin of low germ content, which in comparison to unpurified corresponding enzyme displays a practically unchanged enzyme activity, wherein said contaminated plant enzyme preparation is processed with a stabilized emulsion of a halogenated hydrocarbon with a boiling point between 15°C and 100°C, with or without a cellulose derivative, to form a plastic mass which is dried in known manner.

2. A process for the manufacture of a plant enzyme preparation of low germ content according to claim 1, wherein contaminated bromelin is used.

3. A process for the manufacture of a plant enzyme preparation of low germ content according to claim 1, wherein contaminated papain is used.

4. A process for the manufacture of a plant enzyme preparation of low germ content according to claim 1, wherein contaminated ficin is used.

5. A Process according to claim 5, wherein a halogenated hydrocarbon with a boiling point between 30°C and 60°C.

6. A process according to claim 5 wherein methylene chloride or chloroform is used.

7. A process according to claim 5, wherein a stabilized emulsion containing from 10 to 25% of water is used.

8. A process according to claim 5, wherein the emulsion contains a cellulose derivative in order to stabilize or thicken it.

9. A process according to claim 8, wherein methylhydroxypropyl cellulose or hydroxypropyl cellulose is used as cellulose derivative.

10. A process according to claim 9, wherein the stabilized emulsion contains from 2 to 10% of the cellulose derivative.

11. A process according to claim 10, wherein the stabilized emulsion contains 3% of the cellulose derivative.

12. A process according to claim 1, wherein the plant enzyme is mixed with a given amount of emulsion so that the mixture contains from 10 to 30% of water relative to the enzyme.

13. A process according to claim 12, wherein the mixture contains from 10 to 15% of water.

* * * * *